United States Patent
Malladi

(10) Patent No.: US 9,318,904 B2
(45) Date of Patent: Apr. 19, 2016

(54) BATTERY-CHARGING DEVICE AND METHOD OF MANUFACTURING SAME

(71) Applicant: Google Technology Holdings LLC, Mountain View, CA (US)

(72) Inventor: Sailaja Malladi, Lawrenceville, GA (US)

(73) Assignee: Google Technology Holdings LLC, Mountain View, CA (US)

( * ) Notice: Subject to any disclaimer, the term of this patent is extended or adjusted under 35 U.S.C. 154(b) by 213 days.

(21) Appl. No.: 14/078,562

(22) Filed: Nov. 13, 2013

(65) Prior Publication Data

US 2015/0130403 A1    May 14, 2015

(51) Int. Cl.
*H02J 7/00* (2006.01)

(52) U.S. Cl.
CPC .......... *H02J 7/0042* (2013.01); *Y10T 29/49117* (2015.01)

(58) Field of Classification Search
CPC .................. H02J 7/0052; H02J 7/0042; H02J 2007/0059; Y10T 29/49117
USPC ......................................................... 320/107
See application file for complete search history.

(56) References Cited

U.S. PATENT DOCUMENTS

| | | | | |
|---|---|---|---|---|
| 5,627,450 A * | 5/1997 | Ryan | ...................... | G06F 1/1616 361/679.44 |
| 5,659,236 A * | 8/1997 | Hahn | ............................ | 320/111 |
| 5,847,545 A * | 12/1998 | Chen et al. | ................... | 320/138 |
| 6,970,156 B1 * | 11/2005 | Silverstein | .......... | G06F 3/03543 345/156 |
| 8,432,124 B2 | 4/2013 | Foster | | |
| 9,105,967 B2 * | 8/2015 | Park | ....................... | H01Q 1/243 |
| 9,111,189 B2 * | 8/2015 | Scalisi | ............. | B29C 45/14639 |
| 9,172,263 B2 * | 10/2015 | Lee | ........................ | H02J 7/0042 |
| 9,191,075 B2 * | 11/2015 | Jung | .................... | H04B 5/0037 |
| 2002/0008497 A1 * | 1/2002 | Tanaka et al. | ................. | 320/128 |
| 2002/0043958 A1 * | 4/2002 | Yamaguchi et al. | .......... | 320/113 |
| 2007/0090013 A1 * | 4/2007 | Yoshifusa et al. | ............. | 206/522 |
| 2008/0272733 A1 * | 11/2008 | Huang | .......................... | 320/102 |
| 2010/0207575 A1 * | 8/2010 | Pijnenburg et al. | ........... | 320/108 |
| 2011/0051982 A1 * | 3/2011 | Abreu | ........................... | 381/384 |

(Continued)

FOREIGN PATENT DOCUMENTS

WO    2007090168 A2    8/2007

OTHER PUBLICATIONS ebay: Samsung Battery Charger Stand Combo for Droid Charge SCH 1510 Verizon Phone, eBay, www.ebay.com/itm/OEM-SAMSUNG-BATTERY-CHARGER-STAND-COMBO-FOR-DROID-CHARGE-SCH-i510-VERIZON-PHONE-/3606697368056?pt=U, downloaded from Internet Jun. 19, 2013, all pages.

(Continued)

*Primary Examiner* — Phallaka Kik

(57) ABSTRACT

A battery-charging device includes: a housing that is configurable from a first shape into at least a second shape; and a direct current-to-direct current battery charger disposed within the housing. The direct current-to-direct current battery charger is configured to convert direct current power, received from a source external to the battery charger, into a direct current source for supplying energy to a rechargeable battery that is electrically connected to the battery charger. The battery-charging device may further include a communication element configured to communicate, with a portable electronic device that includes the rechargeable battery, using a short-range communication technology.

18 Claims, 5 Drawing Sheets

(56) References Cited

U.S. PATENT DOCUMENTS

| | | | |
|---|---|---|---|
| 2011/0115713 A1* | 5/2011 | Altman et al. | 345/169 |
| 2011/0273860 A1* | 11/2011 | Corvese et al. | 361/816 |
| 2012/0028682 A1* | 2/2012 | Danne | 455/557 |
| 2012/0319487 A1* | 12/2012 | Shah | 307/66 |
| 2013/0098782 A1 | 4/2013 | Diebel et al. | |
| 2013/0137226 A1* | 5/2013 | Yamade et al. | 438/197 |
| 2013/0162197 A1* | 6/2013 | Takahashi et al. | 320/107 |
| 2014/0071606 A1* | 3/2014 | Bates et al. | 361/679.09 |
| 2014/0080409 A1* | 3/2014 | Frankland et al. | 455/41.1 |
| 2014/0132205 A1* | 5/2014 | Paczkowski et al. | 320/107 |
| 2014/0253024 A1* | 9/2014 | Rautiainen et al. | 320/108 |
| 2015/0036389 A1* | 2/2015 | Freeman | H02M 1/10 363/16 |
| 2015/0155730 A1* | 6/2015 | Miller et al. | 320/114 |

OTHER PUBLICATIONS ebay: Smart Phone Stand Cradle Battery Charger Dock for Samsung Galaxy Note 2II n7100, www.ebay.com/itm/Smart-Phone-Stand-Cradle-Battery-Charger-Dock-For-Samsung-Galaxy-Note-2-II-N7100/251181295724?pt=US_Cell_Phone_PDA_Charg, downloaded from Internet: Jun. 19, 2013, all pages.

Phil Nickinson: GoStick II portable battery, Jun. 10, 2013, www.androidcentral.com/gostick-ii-portable-battery, all pages.

Norther Tool + Equipment, Coleman Portable Folding Solar Panel Charger-7.5, Watt, Model#22007, http://www.northerntool.com/shop/tools/product_200596646_200596646?cm_mmc=Google-pla-_-Alternative%20%2B%20Renewable%20Energy-_-Portable%20Power%20Solutions_-32013&ci_src=17588969&ci_sku=32013&gclid=CPLhkveU0bcCFegWMgodLAcADA, downloaded from internet: Nov. 12, 2013, all pages.

* cited by examiner

BATTERY-CHARGING DEVICE AND METHOD OF MANUFACTURING SAME

FIELD OF THE DISCLOSURE

The present disclosure relates generally to battery-charging devices and more particularly to a portable battery-charging device for supplying energy to a rechargeable battery of a portable electronic device and a method for manufacturing the battery-charging device.

BACKGROUND

Portable electronic devices continue to evolve and prove a multitude of functionality to users of these devices. For example, a smart phone can be loaded with many applications (or "apps") that enrich a user's experience. These apps range from games to utilities, such as sophisticated calculators, to navigation tools, and more. In addition, many portable electronic devices are equipped with touchscreens that serve as a user interface for inputting information into these devices. More particularly, a touchscreen enables a user to provide tactile or touch input by, for example, inputting alphanumeric characters or performing swiping or other gestures directly onto the touchscreen.

Although the enhanced functionality of today's portable electronic devices is desirable, such functionality may drain a rechargeable battery within the device. However, it is not always convenient for a user to charge or re-energize the rechargeable battery using an alternating current-to-direct current (AC-DC) battery-charging device, also referred to as an AC adaptor, which plugs into a wall outlet, for instance. Therefore, portable battery-charging devices that provide a DC-to-DC power mechanism are useful. Nonetheless, some drawbacks of current DC-to-DC portable battery-charging devices include, but are not limited to, a bulky housing usually made of hard plastic, long lead times to tool the hard plastic housing, and a lack of utility other than supplying energy to a rechargeable battery.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
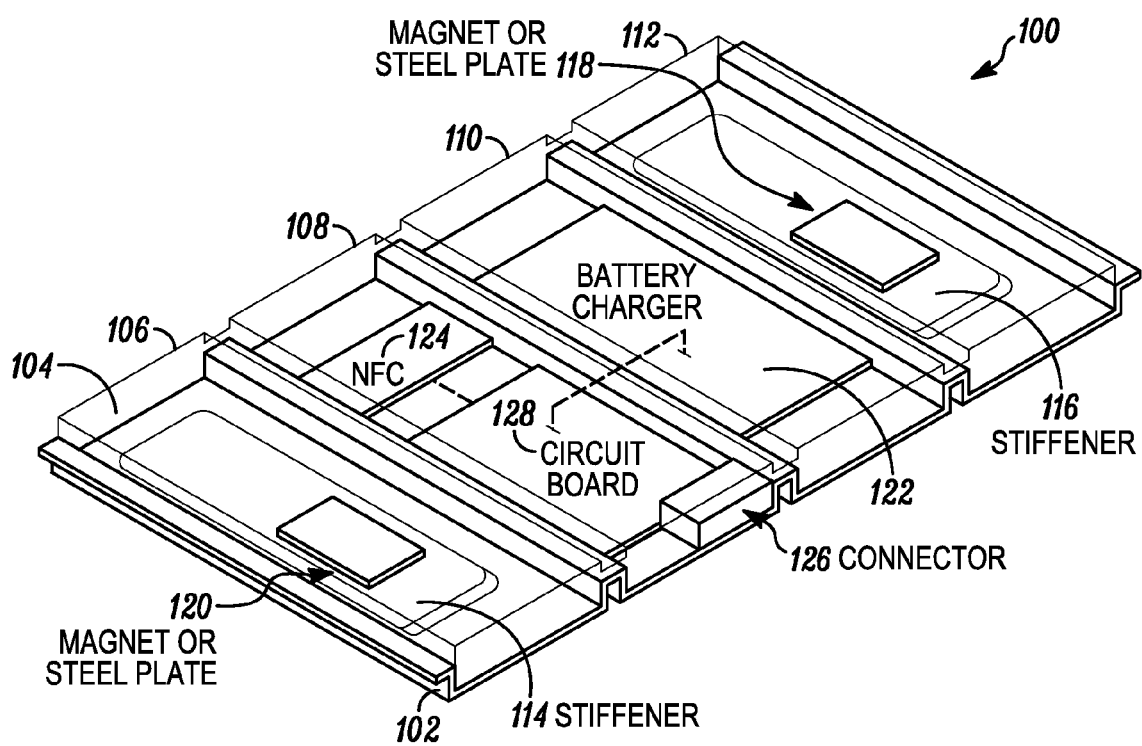
FIG. 1 is a perspective drawing illustrating a topside view of a battery-charging device in accordance with an embodiment of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings.

The apparatus and method components have been represented where appropriate by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to an embodiment of the present teachings, a battery-charging device includes: a housing that is configurable from a first shape into at least a second shape; and a direct current-to-direct current battery charger disposed within the housing. For example, the housing is configurable into a second shape, such as a triangular shape, that supports, on a side of the second shape, a portable electronic device in an inclined position. The DC-to-DC battery charger is configured to convert direct current power, received from a source external to the battery charger, into a direct current source for supplying energy to a rechargeable battery that is electrically connected to the battery charger.

In at least one embodiment, the housing includes a plurality of segments; the DC-to-DC battery charger is disposed within a first segment of the housing; and the battery-charging device further includes a short-range communication element, such as a Near Field Communication (NFC) element, disposed within a second segment of the housing. In at least one other embodiment, the housing is constructed using a foldable material such as thermoplastic polyurethane. In a particular embodiment, the first shape of the housing has: a first dimension of no more than 300 millimeters; a second dimension of no more than 150 millimeters; and a third dimension of no more than 15 millimeters.

In accordance with another embodiment of the present teachings, a method for manufacturing a battery-charging device includes disposing a direct current-to-direct current battery charger within a first segment of a housing that is configurable into multiple segments, which form a second shape from a first shape. The method further includes disposing a short-range communication element within a second segment of the housing. The method may further include disposing at least one of a fastening element or a stiffening element within at least a third segment of the housing to maintain the housing in the second shape.

A benefit of implementing one or more embodiments of the present teachings may include, for example, the battery-charging device serving multiple purposes including supplying energy to a rechargeable battery and serving as a stand for a portable electronic device that contains the rechargeable battery. A further potential benefit is short-range, e.g., NFC, communication capability with the portable electronic device while or to facilitate charging the battery within the portable electronic device. Yet another potential benefit is enhanced portability, including being foldable into a shape that can easily fit into compact spaces such as a pocket or small purse. A further potential benefit is the use of material for the housing of the battery-charging device that does not require expensive and time-consuming tooling to mold a hard, non-flexible, and non-pliable material for the housing.

Referring now to the drawings, and in particular FIG. 1, a perspective drawing illustrating a topside view of a portable battery-charging device, also known as a portable power device, in accordance with some embodiments is shown and indicated generally at 100. The battery-charging device 100 is "portable" in that, in accordance with the present disclosure, the device 100 has physical dimensions and/or weight that allows the device 100 to be easily carried on someone's person, such as in a pocket, purse, or a hand. In some embodiments, the battery-charging device 100 is configurable into a shape this is similar or smaller volumetrically than that of a wallet or of a portable communication device, such as a smart phone.

The battery-charging device 100 includes a housing that holds, therein, one or more elements, also referred to as components, which facilitate the intended operation and functionality of the battery-charging device 100. As shown, the internal elements include a battery charger 122, a communication element 124, a circuit board 128, stiffening elements 114 and 116, and fastening elements 118 and 120. Only a certain number of these elements are shown for clarity and simplicity in the drawing. However, additional or fewer such elements can be used while remaining within the scope of the present teachings. Also, additional elements not shown may be included in other embodiments in accordance with the present teachings, the specifics of which may or may not be described herein for the sake of brevity.

In a particular embodiment, the housing of the battery-charging device 100 includes two pieces of material 102 and 104, which are physically coupled to hold or house one or more internal components, and which form outside 102 and inside 104 housing components. The outside 102 housing component is the housing piece that is primarily visible when the housing is folded into one or more predetermined shapes. Whereas, the inside 104 housing component is the housing piece that is primarily not visible when the housing is folded into the one or more predetermined shapes. The material 102 and 104 can be sewn or stitched together, glued together using an adhesive, stapled together, or otherwise coupled using any other suitable coupling or attachment means.

The material 102 and 104 is the same or substantially the same type of material, in one embodiment. In an alternative embodiment, the material 102 and 104 are different types of material. It should be noted that although material 102 and 104 is illustrated as having corners at right angles and having straight edges, thereby indicating a hard material, this is not necessarily the case. Notwithstanding, a hard material or materials could be used to construct the housing in at least one embodiment. However, in a particular embodiment, the housing 102, 104 is constructed from foldable, flexible, and pliable material, meaning the material is easily folded. In a further embodiment, the housing 102, 104 is constructed from supple material that is easily bended without breaking or becoming deformed.

In one particular embodiment, the housing material 102 and/or 104 is constructed using a foldable plastic material, such as thermoplastic polyurethane (TPU), although any suitable supple plastic, urethane, vinyl, polymer, resin, or other material such as leather can be used, for instance. In an embodiment where the housing material 102 and 104 are different types of material, the outside 102 housing component is constructed using one of the aforementioned materials; and a different one of the aforementioned materials is used to construct the inside 104 housing component.

In another embodiment, the outside 102 housing component is constructed using one of the aforementioned materials; and a lighter weight, more breathable or air penetrable, and/or less costly material is used to construct the inside 104 housing component. For example, the inside 104 housing component is constructed using nylon, cloth, or any suitable fabric having a lower density or mass per unit volume than the material used to construct the outside 102 housing component. However, multiple combinations of material can be used in other embodiments to construct the housing 102, 104 to provide, for example, different colors, textures, pliability, durability, and/or longevity to the outside 102 housing component and to manage cost, enhance lightweight portability, and/or allow better air passage or air flow to the internal elements of the battery-charging device 100 to assist with cooling the internal elements.

The battery charger 122, also referred to as a battery pack and a charger, is a DC-to-DC battery charger meaning that it is configured to convert direct current power, received from a source external to the battery charger, into a direct current source for supplying energy to a rechargeable battery that is electrically connected to the battery charger. "Adapted," "operative" or "configured" as used herein means that the indicated element has the necessary physical structure or hardware, and in some embodiments software and/or firmware to program the hardware, to carry out the element's intended functionality.

The external source that supplies the direct current power to the charger 122 is an external AC source, such as an AC adaptor that plugs into a wall outlet or socket and converts AC power to DC power. Alternatively, the external source that supplies the direct current power to the charger 122 is another electronic device, to which the device 122 is electrically connected, such as a computer, which is powered using an AC adaptor. It should be noted that the terms battery charger, DC-to-DC battery charger, charger and non-solar battery charger are defined herein to exclude solar powered or solar-based battery chargers. Solar powered or solar-based battery chargers, by contrast, receive power directly or indirectly from solar energy and/or convert solar energy, or energy derived from solar energy, into DC power.

Accordingly, the battery charger 122 works by supplying a constant or pulsed DC power source to a battery being charged. The battery charger 122 can be a simple charger that doesn't alter its output based on time or the charge of the battery. Alternatively, the battery charger 122 is an intelligent or smart charger with the capability, for instance using a chip or other electronic component within or external to the charger 122, of communicating with the charging battery about battery characteristics and condition or state. In this manner, the smart charger can respond to the condition or state of the charging battery and, responsively, modify its charging action.

The communication element 124, which is a wireless communication element, is configured to communicate, using a short-range communication technology, with a portable electronic device that includes a rechargeable battery to be or being charged by the battery charger 122. In one embodiment, a short-range communication technology means a wireless protocol used to communication information between two devices that are within 100 meters of each other. An example of a short-range communication technology is Bluetooth as standardized by the Bluetooth Special Interests Group and which currently operates in the unlicensed industrial, scientific and medical (ISM) band at 2.4 to 2.485 GHz.

However, other standard or proprietary short-range communication technologies can be used. In the particular embodiment illustrated in FIG. 1, the short-range communication element 124 is a Near Field Communication (NFC) communication element that uses NFC technology, as standardized for instance in ISO/IEC (International Organization for Standardization/International Electrotechnical Commission) 18092 and 21481 and EMCA (European Computer Manufacturers Association)-340 and -352, and all subsequent specification versions.

In one example use case, the short-range communication element 124 is used to exchange or communicate information for authentication purposes. Thus, the communication element 124 can authenticate the portable electronic device to which it is wirelessly connected; and/or the portable electronic device can authenticate the communication element 124. This is useful, for instance, so that the user does not have to manually unlock the portable electronic device in order to charge its battery.

In further embodiments, the short-range communication element 124 is used to exchange or communicate other information such as the battery characteristics and condition or state of a battery being charged by the charger 122, as mentioned above. An added benefit of the communication element 124 implementing NFC technology is that this particular short-range communication technology requires a distance between the communicating devices of 10 centimeters or less, which enhances secured communication of information between the communicating devices.

The circuit board 128, in one possible embodiment, is electrically connected, for instance using any suitable wired connection, to one or both of the short-range communication element 124 or the battery charger 122. For example, the circuit board 128 contains one or more chips that implement one or more controllers for controlling the operations of the short-range communication element 124 and/or the battery charger 122.

In one particular embodiment, the circuit board 128 electrically connects to and controls the short-range communication element 124. For instance, the short-range communication element 124 includes the hardware used to communicate wireless messaging or signaling with a short-range communication element within the portable communication device having its battery charged by the battery charger 122. Accordingly, the circuit board 128 contains the memory and processing elements to, respectively, store and process data and other information in order to implement the particular wireless protocol, e.g., NFC protocol, used by the hardware 124 to communicate with the receiver or transceiver hardware within the portable communication device.

In another embodiment, the circuit board 128 controls one or more aspects of the operation of the battery charger 122. For example, as mentioned above, the battery charger 122 receives direct current power from an external source. Accordingly, in one particular embodiment, the circuit board 122 controls the speed and degree to which the external source provides the direct current power to energize or charge the battery charger 122.

Moreover, the circuit board 128 includes one or more connectors 126 to electrically connect a portable electronic device to the battery-charging device 100 using any suitable wired connection such as a cable. The connector 126 is used to transfer the direct current from the battery charger 122 to the portable electronic device to supply energy to a rechargeable battery internal to the portable electronic device. The connector 126 can take any number of forms including, but not limited to, a Universal Serial Bus (USB) connector, a micro-USB connector, etc.

In addition to a unique combination or assembly of electronic components disposed within its housing 102, 104, the battery-charging device 100 further has disposed therein a novel combination or assembly of mechanical components. For example, in an embodiment, the type of material used to form the housing 102, 104 lacks the structural integrity (due to its suppleness) to maintain the housing in at least one intended or predetermined folded shape, for example a second shape. For such embodiments, the battery-charging device 100 includes a set of at least one (i.e., at least a first) material piece, also referred to herein as stiffening material, a stiffening element, and a stiffener, having a stiffness that is greater than a stiffness of the material used to construct the housing. The at least a first stiffening material piece is disposed within the housing to maintain the housing in the second shape, and, thus, provide stability to the housing when the housing is constructed from supple material.

In the particular embodiment shown in FIG. 1, the battery-charging device 100 includes stiffeners 114 and 116 disposed within the housing 102, 104. Any suitable material can be used for the stiffeners 114 and 116 that has sufficient rigidity and, thereby, the structural integrity to maintain the housing in one or more predetermined shapes and that may satisfy other design parameters such as weight and cost restrictions. In one embodiment, the stiffeners 114, 116 are constructed from a composite, a plastic or polymer, such as a thermoplastic polymer like a polycarbonate, polymethyl methacrylate, etc.

The embodiment of the battery-charging device 100 shown in FIG. 1 also includes the mechanical components of fastening elements 118 and 120, also collectively referred to herein as a fastening device, disposed within the housing to maintain the housing in at least one intended or predetermined folded shape, for example a second shape. In the particular embodiment shown in FIG. 1, the fastening device 118, 120 includes a magnet and a metal plate such as a steel plate. However, in other embodiments, the fastening device includes any suitable mechanism for securing the housing 102, 104 into a particular shape including, but not limited to, clasping mechanisms, snapping mechanisms, tying mechanisms, hook-and-loop fasteners, etc.

As mentioned before, a feature of the device is that the housing is configurable from a first shape into at least one other shape, such as a second shape or a third shape, as referred to herein. This is facilitated, at least in part, by forming the housing into multiple segments. The number of segments that the housing contains depends, for instance, on the one or more shapes into which a manufacturer intends the device to be folded. Such shapes are also referred to herein as predetermined or intended shapes. In a further embodiment, the placement of one or more of the internal elements, such as the stiffening elements and the fastening device, into the various segments of the housing also assists in maintaining the housing in a certain shape. As used herein, a segment or housing segment means a part or section of the housing that is at least partially separated from another part or section of the housing. The segments can be partitioned using the material of the housing, such as by forming a partly or completely closed seam between multiple segments, for instance.

In the embodiment shown in FIG. 1, the housing 102, 104 includes four segments 106, 108, 110, 112 that contain the internal elements of the battery-charging device 100. As shown, the DC-to-DC battery charger 122 is disposed in a first segment 110 of the housing. The short-range communication element 124 is disposed in a second segment 108 of the housing. The stiffening material 114, 116 and the fastening device 118, 120 are disposed within third 106 and fourth 112 segments of the housing. Arrangement of the internal elements can be due to such factors as: amount of space within each segment; certain elements (such as the electronics) being in close proximity to facilitate their electrical connection; the stiffeners being located in segments that don't otherwise have elements such as electronics to stabilize the housing; the stiffeners and fastening device being located in segments that keep the housing in a certain intended folded shape, etc.

Figure 2:
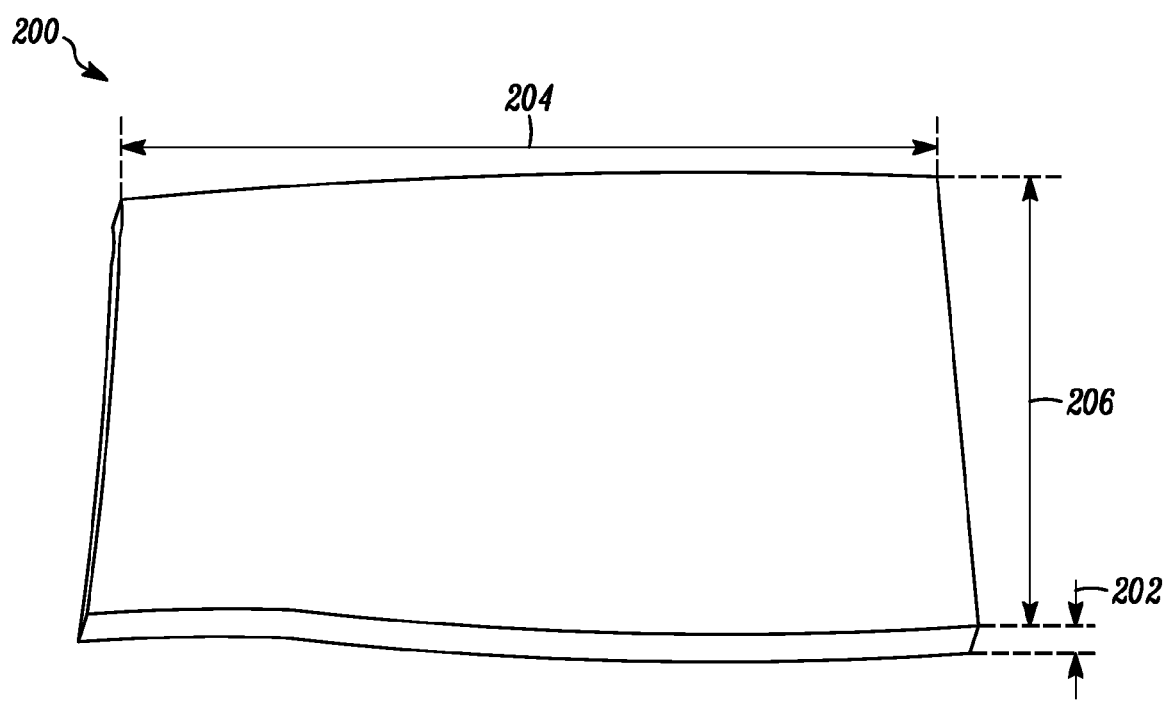
FIG. 2 is a perspective drawing illustrating a first configuration of the housing of a battery-charging device in accordance with an embodiment of the present teachings.
Figure 3:
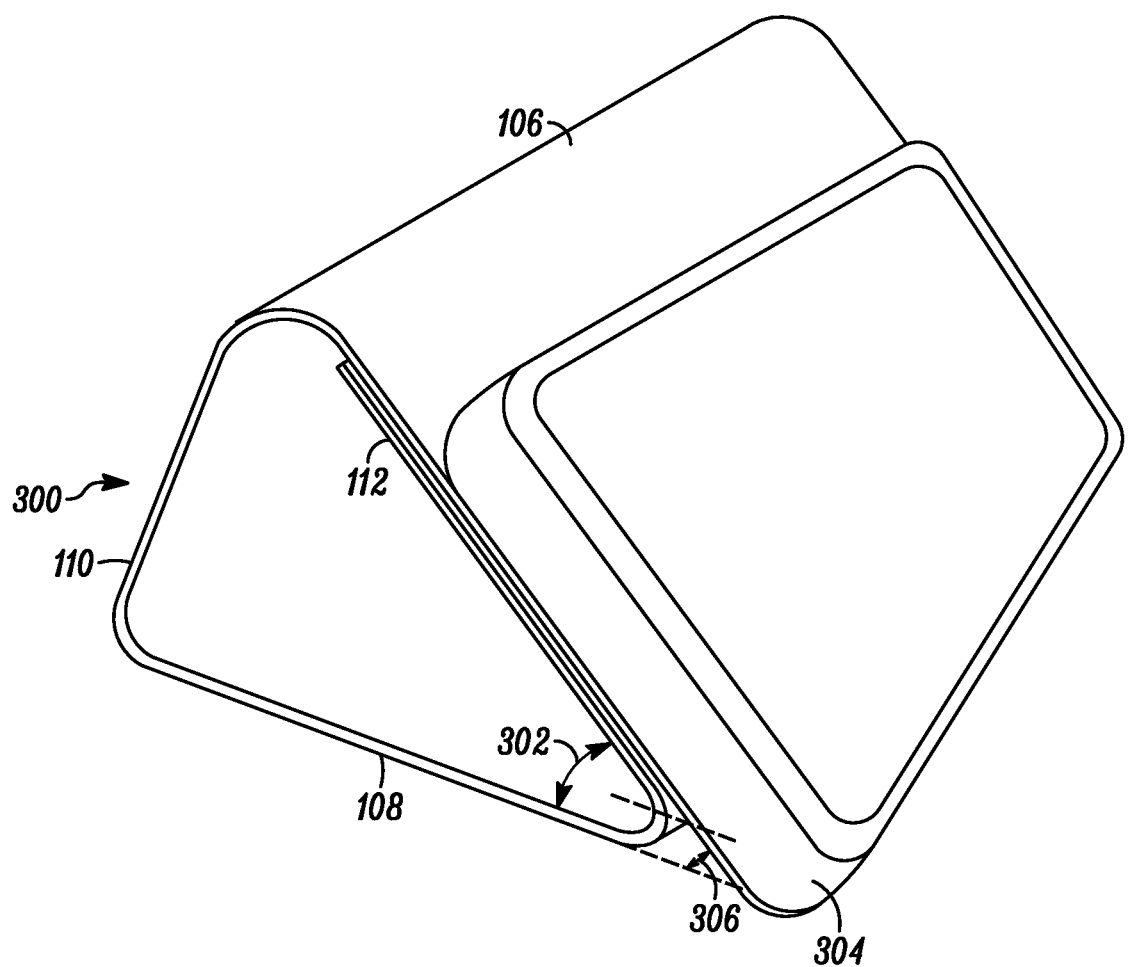
FIG. 3 is a perspective drawing illustrating a second configuration of the housing of a battery-charging device in accordance with an embodiment of the present teachings.
Figure 4:
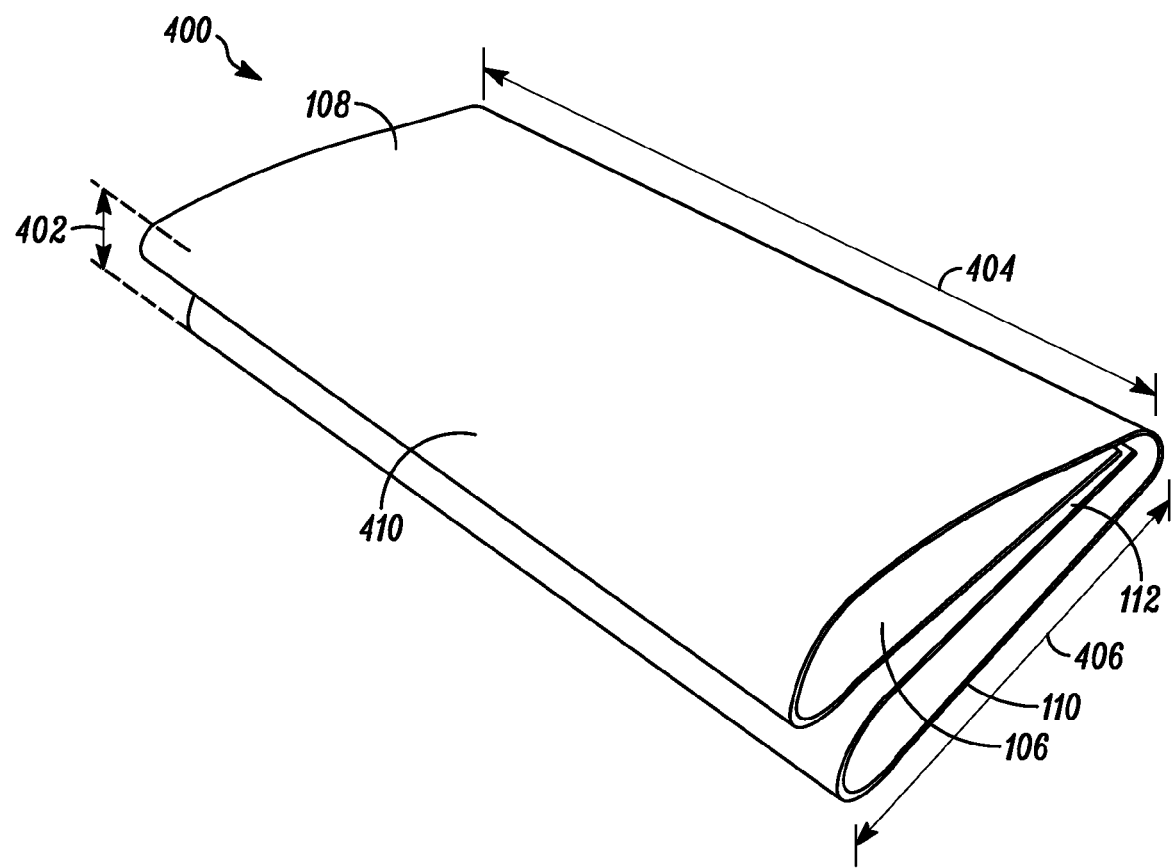
FIG. 4 is a perspective drawing illustrating a third configuration of the housing of a battery-charging device in accordance with an embodiment of the present teachings.

FIGS. 1 to 4 illustrate a particular embodiment of a battery-charging device 100 in accordance with the present teachings. Specifically, FIGS. 2 to 4 illustrate schematic drawings representing perspective views of different intended shapes of the battery-charging device 100 shown in FIG. 1, wherein the housing 102, 104 is constructed using supple material that lacks sufficient structural integrity to maintain the device 100 in a second shape.

In this embodiment, the housing 102, 104 has a first shape 200 when the housing is unfolded and substantially flat as shown in FIG. 1 and by reference to FIG. 2. As mentioned above, the battery-charging device 100 has dimensions that make the device 100 portable. The dimensions also facilitate folding the device 100 into one or more intended shapes. In the example shown by reference to FIG. 2, the first shape 200 is substantially a cuboid or rectangular prism having a first dimension 204 of no more than 300 millimeters, a second dimension 206 of no more than 150 millimeters, and a third dimension or thickness 202 of no more than 15 millimeters. For instance, the thickness 202 is set just large enough to accommodate a specific thickness or a range of thicknesses for the battery charger 122 or other electronics. Specifically, as shown, the first dimension 204 is about 260 millimeters. The second dimension 206 is about 115 millimeters, and the thickness 202 is about 17 millimeters.

Due, at least in part, to the four segments, 106, 108, 110, 112, the battery-charging device 100 is configurable into a second shape 300, as shown in FIG. 3. In this embodiment, the second shape has at least one angle 302 that is less than 90 degrees, and the second shape 300 is, in particular, triangular. As such, the second shape 300 is configured to support, on a side (e.g., formed from segments 106, 112) of the second shape 300 a portable electronic device 304 in an inclined position. An inclined position means that the portable electronic device 304 makes an angle 306 with a side, e.g., formed from segment 108, of the device 100. However, the second shape can be any shape that allows the portable electronic device 304 to rest on or against a side of the battery-charging device 100, for instance while the electronic device 304 is having its battery charged by the battery-charging device 100. Such shapes include, by way of example only, a cube, a cuboid, different shaped pyramids and prisms, etc. The portable device 304 can be various types of devices such as a smart phone, a cellular phone, a phablet, a tablet, etc.

Turning now to FIG. 4, shown therein is the battery-charging device 100 being configurable into a third shape 400 using the segments 106, 108, 110, and 112. For instance, the third shape 400 minimizes volume and, thereby, maximizes portability of the battery-charging device 100. In an embodiment, the third shape 400 has three dimensions, e.g., 402, 404, 406, and one of the three dimensions, e.g., 402 is no more than 30 millimeters. In the particular embodiment shown, the dimension 402 is about 17 millimeters. The dimension 404 is about 115 millimeters, and the dimension 406 is about 60 millimeters, which make the shape 400 correspond to a volumetric size similar to that of a smart phone and, thereby, allows the battery-charging device 100 to easily fit into a person's pocket, for instance.

Figure 5:
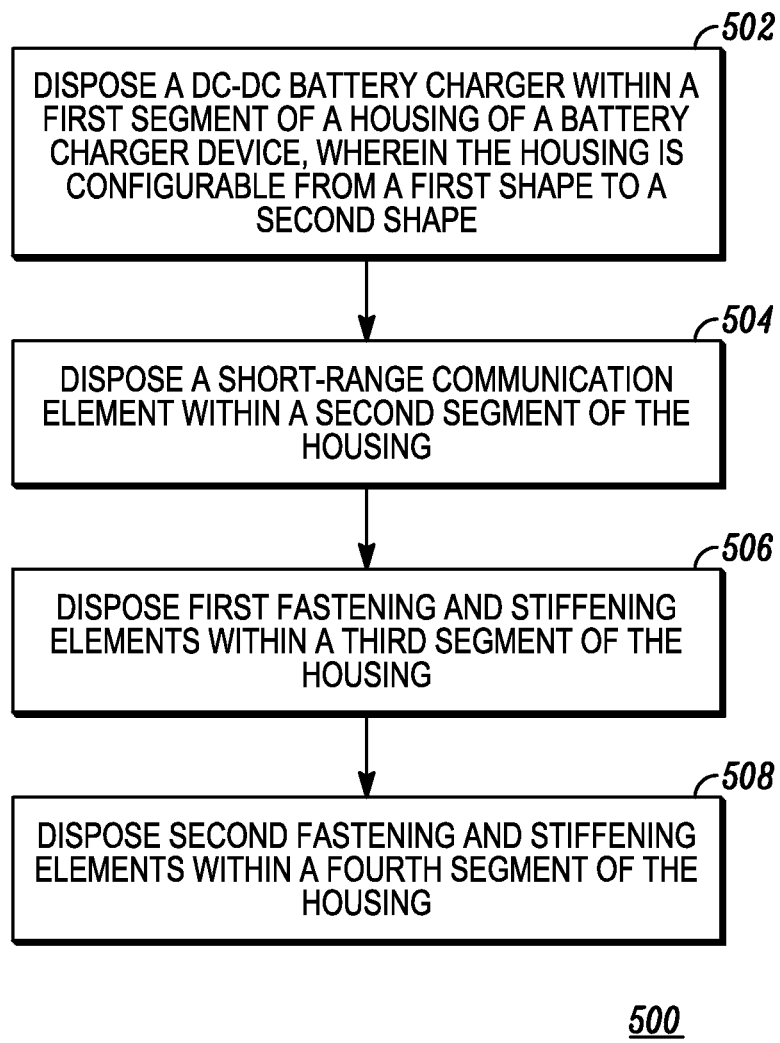
FIG. 5 is a flowchart illustrating a method of manufacturing a battery-charging device in accordance with an embodiment of the present teachings.

FIG. 5 shows a flowchart illustrating a method 500 of manufacturing a battery-charging device in accordance with an embodiment of the present teachings. For example, suitable machinery can be used to automate at least some parts of the process 500. In addition, other processing functions needed to manufacture a battery-charging device in accordance with the present teachings may be well known and, hence, not described here for the sake of brevity.

Where two housing pieces are used, for example formed from different materials, the two housing pieces can first be cut to the desired dimensions, which may be substantially the same dimensions. The two housing pieces thus define the housing for a battery-charging device. The internal elements are then disposed within the two housing pieces. In one embodiment, the internal elements are laid on top of one housing piece and the other housing piece is coupled to the first housing piece to form the segments that contain the internal elements. In another embodiment, the two housing pieces are at least partially attached; the internal elements are inserted into partial segments; and the attachment of the two housing pieces is completed to form the segments containing the internal elements.

Particularly, the method includes disposing 502 a direct current-to-direct current battery charger within a first segment of a housing that is configurable into multiple segments, which form a second shape from a first shape. In an embodiment that facilitates the battery-charging device using short-range communication, a short-range communication element is disposed 504 into a second segment of the housing. In one particular embodiment, disposing the short-range communication element within the second segment of the housing includes disposing a Near Field Communication element within the second segment of the housing. However, the communication element could use a different short-range technology in other embodiments.

Furthermore, where supple materials are used to construct the housing, such as TPU and nylon for instance, the method 500 includes disposing 506 a first stiffening element within a third segment of the housing and disposing 508 a second stiffening element with a fourth segment of the housing. Additionally, in some embodiments, a first fastening element can be disposed 506 in the third segment of the housing, and a second fastening element can be disposed 508 in the fourth segment of the housing to maintain an intended shape of the housing.

As described, method 500 facilitates manufacturing a battery-charging device having internal elements disposed within four segments of the housing. However, any number of segments can be created to form any number of shapes when the battery-charging device is folded.

In the foregoing specification, specific embodiments have been described. However, one of ordinary skill in the art appreciates that various modifications and changes can be made without departing from the scope of the embodiments as set forth in the claims below. Accordingly, the specification and figures are to be regarded in an illustrative rather than a restrictive sense, and all such modifications are intended to be included within the scope of present teachings.

Any possible benefits, advantages, solutions to problems, and any element(s) that may cause any such benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A battery-charging device comprising:
    a housing that is configurable to fold at least from a first shape into a second shape and from a first shape into a third shape, wherein:
        the first shape is substantially flat and unfolded,
        the second shape is folded and is configured to support, on a side of the second shape, a portable electronic device in an inclined position, and
        the third shape is folded with each end of the housing folded inside the housing;
    a battery charger disposed within the housing, wherein the battery charger is configured to convert direct current power, received from a source external to the battery charger, into a direct current source for supplying energy to a rechargeable battery that is electrically connected to the battery charger; and
    a communication element configured to communicate, with the portable electronic device that includes the rechargeable battery, using a short-range communication technology.

2. The battery-charging device of claim 1, wherein the short-range communication technology is Near Field Communication.

3. The battery-charging device of claim 1, wherein the second shape has at least one angle that is less than 90 degrees.

4. The battery-charging device of claim 3, wherein the second shape is triangular.

5. The battery-charging device of claim 1, wherein the third shape has three dimensions, and one of the three dimensions is no more than 30 millimeters.

6. The battery-charging device of claim 1, wherein the first shape has:
    a first dimension of no more than 300 millimeters;
    a second dimension of no more than 150 millimeters; and
    a third dimension of no more than 15 millimeters.

7. The battery-charging device of claim 1 further comprising a fastening element disposed within the housing to maintain the housing in the second shape.

8. The battery-charging device of claim 7, wherein the fastening element comprises at least one magnet and corresponding metal piece.

9. The battery-charging device of claim 1, wherein the housing is constructed using a foldable plastic material.

10. The battery-charging device of claim 9, wherein the foldable plastic material comprises thermoplastic polyurethane.

11. The battery-charging device of claim 9 further comprising at least a first material piece having a stiffness that is greater than a stiffness of material used to construct the housing, wherein the at least a first material piece is disposed within the housing to maintain the housing in the second shape.

12. A method for manufacturing a battery-charging device, the method comprising:
    disposing a direct current-to-direct current battery charger within a first segment of a housing that is configurable into multiple segments, which form a second shape from a first shape and a third shape from the first shape, wherein:
        the first shape is substantially flat and unfolded,
        the second shape is folded and is configured to support, on a side of the second shape, a portable electronic device in an inclined position, and
        the third shape is folded with each end of the housing folded inside the housing; and
    disposing a short-range communication element within a second segment of the housing.

13. The method of claim 12, wherein disposing the short-range communication element within the second segment of the housing comprises disposing a Near Field Communication element within the second segment of the housing.

14. The method of claim 12 further comprising disposing at least one of a fastening element or a stiffening element within at least a third segment of the housing to maintain the housing in the second shape.

15. A battery-charging device comprising:
    a housing having a plurality of segments that are configurable to fold at least from a first shape into a second shape and from a first shape into a third shape, wherein:
        the first shape is substantially flat and unfolded,
        the second shape is folded and is configured to support, on a side of the second shape, a portable electronic device in an inclined position, and
        the third shape is folded with each end of the housing folded inside the housing;
    a direct current-to-direct current battery charger disposed within a first segment of the housing; and
    a short-range communication element disposed within a second segment of the housing.

16. The battery-charging device of claim 15, wherein the housing includes four segments.

17. The battery-charging device of claim 16 further comprising stiffening material having a greater stiffness than material used to construct the housing and a fastening device, wherein the stiffening material and the fastening device are disposed within the third and fourth segments of the housing to maintain the housing in the second shape.

18. The battery-charging device of claim 15, wherein the short-range communication element comprises a Near Field Communication element.

\* \* \* \* \*